May 29, 1956  G. L. MORRISON  2,747,459
PHOTOGRAPHIC APPARATUS
Original Filed Dec. 2, 1948  2 Sheets-Sheet 2
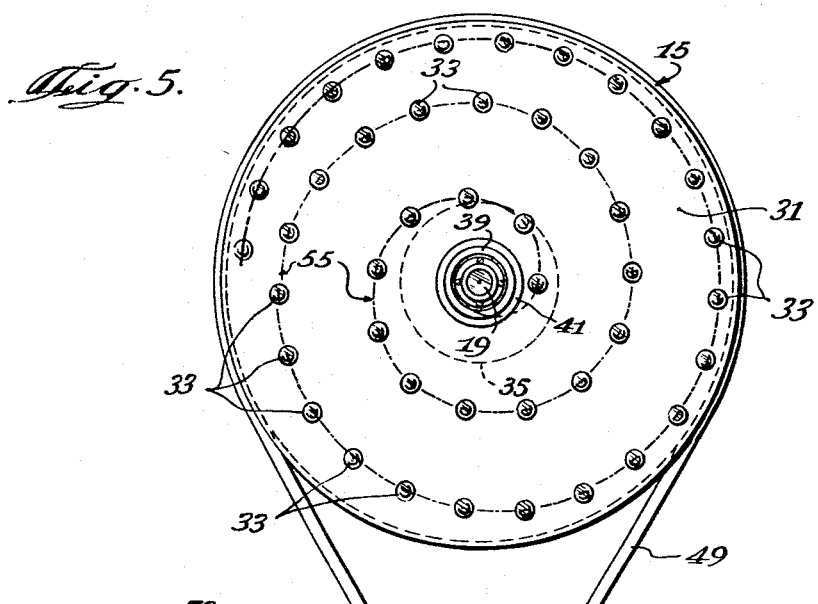
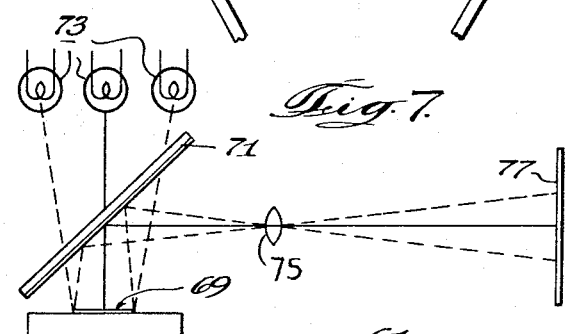
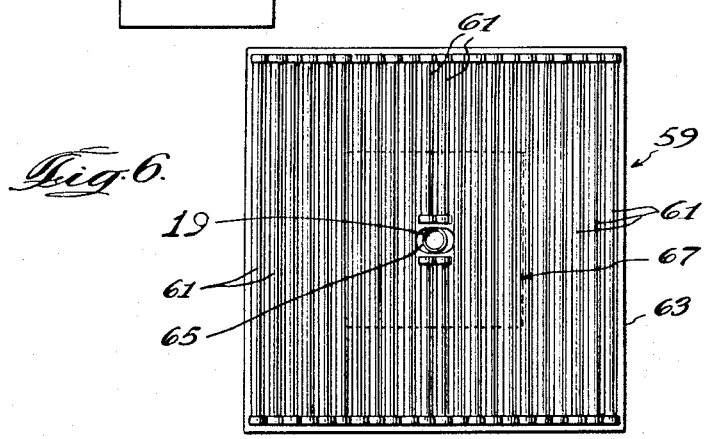
Inventor:
George L. Morrison
By Soans Glaister & Anderson
Attorneys

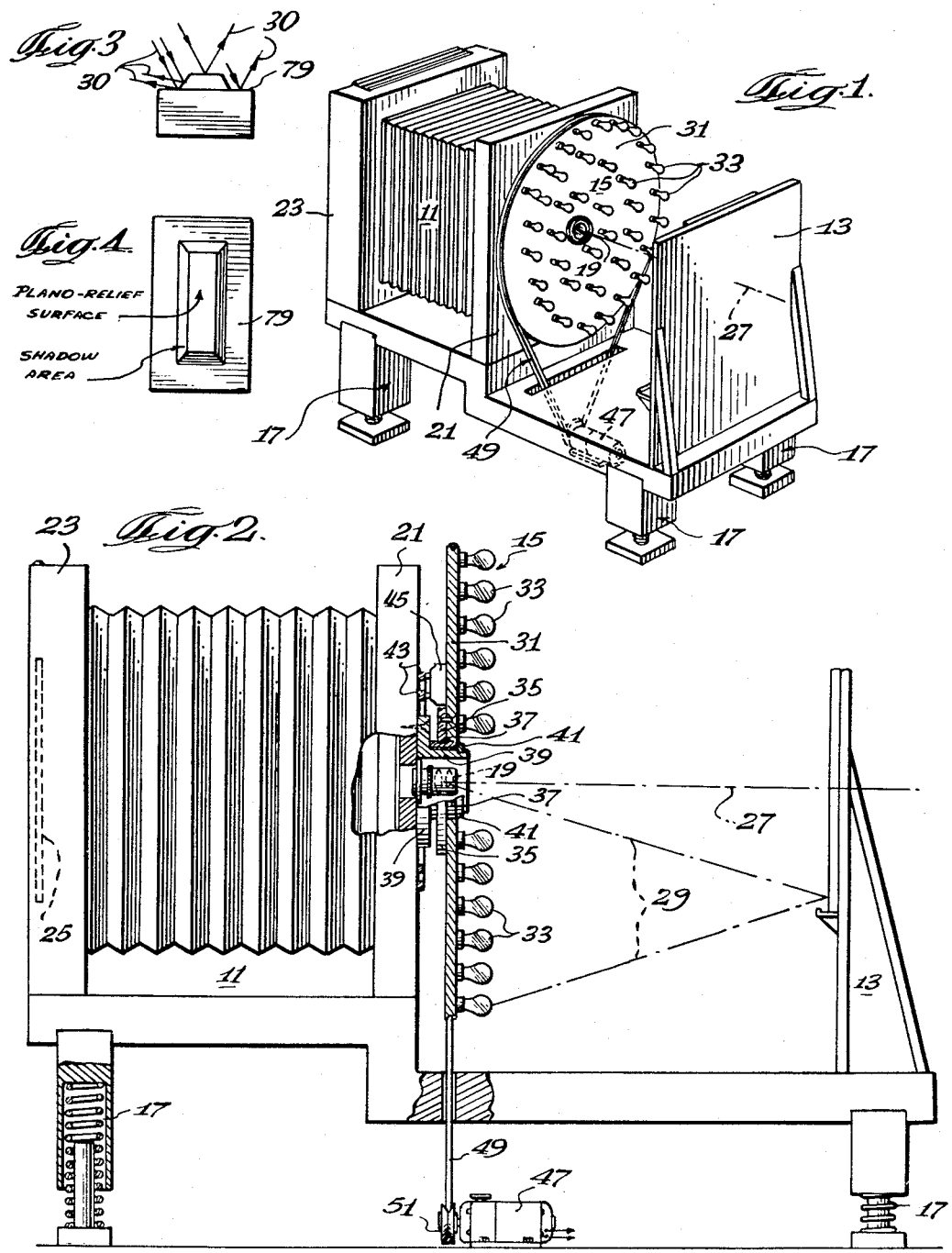

United States Patent Office 2,747,459
Patented May 29, 1956

2,747,459

PHOTOGRAPHIC APPARATUS

George L. Morrison, Evanston, Ill.

Original application December 2, 1948, Serial No. 63,037, now Patent No. 2,609,293, dated September 2, 1952. Divided and this application August 18, 1952, Serial No. 305,005

4 Claims. (Cl. 88—24)

The present invention relates to apparatus which is particularly adapted for photographing printing surfaces of either the raised or the intaglio type.

It is the practice in the every day production of certain types of gravure and other photo-mechanical printing surfaces, as for example in the photogravure and rotogravure processes, to effect the transfer to that surface of text, and other material to be reproduced, by a process which requires the utilization of a photographically produced print or transparency of such text or other material.

The principal object of the present invention is to provide an improved apparatus for illuminating and for photographing printing forms and like copy material and more particularly, to provide an improved apparatus for illuminating and for photographing the plano relief surfaces of letter-press printing forms so as to create a shadow area which outlines and sharply defines such surfaces from their backgrounds.

Other objects include the provision of a novel apparatus for photographing raised or intaglio printing surfaces, in accordance with the above stated principal object, to produce prints or transparencies having adequate density and contrast for photo-mechanical purposes, without the need for local or general intensification of the image; and generally, the provision of improved apparatus for obtaining photographic prints or transparencies of the various plano-relief printing surfaces usually contained in printing forms.

The invention is based on the discovery that high density, sharply defined, photographic images of uniform contrast can be obtained from type and like printing surfaces by the use of a photo-engraver's camera providing the illumination of the surface to be photographed is effected in such manner that a shadow area is created around each of the plano-relief surfaces to be photographed and provided further that the photographic image is produced by light which is to some extent diffusely reflected from that surface. The obtaining of photographic images by this procedure requires the use of specially designed light sources.

Certain illustrative types of illuminating apparatus and photographic equipment designed in accordance with the present invention are illustrated in the accompanying drawings wherein:

Figure 1 is a perspective view of a photo-engraving camera, copy board, and light source suitable for use in photographing printing forms and the like;

Figure 2 is an enlarged side elevational view partially in section of the apparatus illustrated in Figure 1;

Figures 3 and 4 are respectively end and plan elevations illustrating the manner in which type characters or other plano-relief surfaces are illuminated by the apparatus illustrated in Figures 1 and 2;

Figure 5 is a front elevational view of the light source comprising a part of the apparatus illustrated more completely in Figures 1 and 2;

Figure 6 is a view showing another type of lightsource which may be used in place of the light-source illustrated in Figures 1 and 2, and;

Figure 7 is a diagrammatic view illustrating a further modified light-source and camera arrangement in accordance with the invention.

The photographic apparatus illustrated in Figures 1 and 2 includes a camera 11, a copy board 13, and a source of illumination 15. The camera 11 may be a conventional photo-engraver's camera and is desirably of the dropped-bed type, as illustrated. The camera 11 is mounted upon springs 17 or other vibration dampening means, and it is equipped with a lens 19 of the usual type, which may include a conventional shutter and an iris diaphragm. The lens 19 is supported upon the forward bellows-support 21, and that support is desirably movable toward and away from the rear bellows-support 23 in order to permit focusing of the camera in conventional manner. The rear bellows-support 23 includes a ground-glass plate for focusing, as indicated at 25, and may also be provided with means for receiving a plate holder, or other equipment for positioning sensitized material in the plane of the ground-glass during the photographing operation. The copy board 13 is supported at the forward end of the camera bed, and the plane of the copy board 13 is located symmetrical with, and at right angles to, the optical axis of the lens 19, which is indicated by the dot and dash line 27.

The illuminating means or light-source 15 for the printing surface, printing form, or other material to be photographed is of special design. In order to accomplish the objective of a shadow area surrounding each of the plano-relief surfaces to be photographed, the lightsource must be of such dimensions, and so positioned, that light, in the form of an image of at least a portion of the light-source, will be reflected from all parts of a plane surface coincident with the surface to be photographed to, or approximately to, the optical center of a lens symmetrically positioned in front of that surface. This means that an ideal light-source, as above described, should produce illumination equivalent to the illumination produced by a solid sheet of light having overall dimensions which are (for full size photographic reproduction) twice the corresponding dimensions of the surface to be photographed, the sheet of light being located in a plane which is parallel to the surface to be photographed and which intersects the optical axis of the lens at, or approximately at, the optical center thereof, and the intensity of the sheet of light being such that uniform density images are produced from all of the reflecting areas.

It can be shown that in order to obtain exact uniform density photographic images when using a light-source as above described, the intensity of the illumination provided by the light-source should vary at different points in the plane of the surface being photographed as the reciprocal of the fourth power of the cosine of the angle that each such point makes with the optical axis of the camera lens. For relatively small lens angles, illumination at an intensity level corresponding to the inverse square law (i. e., even intensity illumination over the entire surface being photographed) will approximate this requirement. However, when the lens angle becomes much greater than about 10 degrees, increased intensity illumination in the outer regions of the surface being photographed in accordance with the reciprocal of the fourth power of the cosine, as above described, will be found highly desirable. The criticality of the increase in illumination required in the outer regions of the light-source depends to some extent upon the latitude of the photographic materials employed, as might be expected.

The above-stated requirements of an ideal light-source are not wholly attainable in practice. Of necessity, there must be an opening in the center of the light-source for the lens. Also, a solid sheet of light of sufficient dimensions for the illumination of the relatively large surfaces included in a printing form or the like, is not obtainable. Thus, the light-sources actually available for use in the commercial practice of the invention can constitute only approximate equivalents of the solid-sheet light-source, as above described. Close approximations are, however, possible. For example, for the illumination of relatively small area surfaces, where inverse-square law illumination is adequate, a reciprocating bank of fluorescent lamps, as illustrated in Figure 6 can be used as the light-source. Unfortunately, the intensity of fluorescent lamps is comparatively low, and the resultant longer exposure is not considered good practice. Another, and more satisfactory, very close equivalent is a revolving bank of individual lamps, as illustrated at 15 in the drawings. This arrangement is particularly suitable for photographing complete printing forms and similar large areas, in that it provides an easy and inexpensive means for obtaining readily controlled variation in the intensity level of the illumination over the area being photographed, and, in addition, the intensity of the individual lamps can be varied to match the desired exposure time.

It should be noted that both of the above-suggested light-sources provide relative movement of the source of illumination and the material being photographed during the photographing operation. This is an important feature in obtaining even illumination of printing forms and other material of substantial area with an absence of spot reflections, when using practical equivalents of the ideal light-source described in the foregoing.

The dot and dash lines 29 in Figure 2 represent the path of a ray of light from the outer edge of the illuminating means shown in Figures 1 and 2 to the outer edge of a plane reflecting surface disposed on the copy board 13, and from that surface to the optical center of the lens 19. Figures 3 and 4, wherein the lines 30 indicate the path of incident and reflected light rays, illustrate the manner in which illumination of this type produces the desired shadow area outlining the various plano surfaces contained in the type form or other material disposed on the copy board. From an examination of Figure 3, it will be evident that almost no light will be reflected to the lens from surfaces which are not at least nearly parallel to the plane of the copy board. It will be evident, therefore, that the light-source will produce the desired shadow area about the type, type-slugs or the other printing surfaces usually contained in a printing form. As is well-known, all of such surfaces are conventionally outlined by rather steep-sided, plane or curved surfaces. The small area adjacent the optical axis of the lens which is not illuminated in exact accord with the foregoing, does not cause any difficulty, apparently because ordinary variations in the surfaces to be photographed produce a self-compensating effect.

The obtaining of illumination which will provide the outlining shadow area and which will reflect light from the plano surfaces, as described, requires the use of a light-source which is of substantially greater area than the area of the printing surface, printing form, or other material to be photographed, although, as will be apparent from the geometry of Figure 2, the area of the light-source may vary, depending upon the distance between the source of illumination and the material being photographed. The essential feature is that the relative dimensions and position of the light-source shall be such that the illumination produced on the surface to be photographed is equivalent to the illumination produced, during ordinary full size photography, by a solid sheet of light of proper intensity having overall dimensions which are twice the corresponding dimensions of the surface to be photographed, when that sheet of light is positioned in a plane which is parallel to the surface to be photographed and which intersects the optical axis of the lens, at, or approximately at, the optical center thereof. Under the stated condition or ordinary, full size photography, the sheet of light and the lens are, of course, spaced from the surface to be photographed a distance equal to twice the focal length of the lens.

The most satisfactory position for the light-source is the above described position adjacent the camera lens, but as above noted, other arrangements are possible, provided that the equivalent illumination is produced. For a given focal length lens, it can be shown that if the light-source is located nearer the surface to be photographed, the overall dimensions and area may be decreased; and if it is located farther away, they must be increased. However, when the light-source is located in any position other than adjacent the camera lens, it becomes difficult to accomplish proper illumination of the material to be photographed, due to interference with the camera or with the lens. It is also not essential that the light-source be disposed in a plane (i. e., that the light-source be flat) although the plane construction is greatly to be preferred, both from the viewpoint of obtaining better control of the illumination, and from the viewpoint of simplifying the construction and operation of the apparatus. In view of the advantages of using a light-source which is substantially planar and which is located adjacent the lens, the light-source illustrated at 15 in Figure 2 is of the planar type and is shown in this position.

In the particular apparatus illustrated in Figures 1 and 2, the light-source 15 includes a rotatable light-support 31, which may constitute a circular disc of plywood, or equivalent structure, having mounted thereon a plurality of ordinary, incandescent filament, light bulbs 33, as illustrated. The light-support 31, is attached to a flange 35 (Figure 2) which constitutes a part of a cylindrical hub 37, and the hub 37 is adapted to be disposed upon a hollow bearing member 39, so as to permit rotation of the light-source. The bearing member 39 is illustrated as being attached to the forward bellows-support element 21 of the camera, but it may desirably be attached to a separate support to eliminate vibration. The light-support 31 and the hub 37 are retained in position on the bearing member 39 by a suitable retainer ring 41 and the arrangement is such that the entire structure is freely rotatable on the bearing member 39. Electrical power is conducted to the light bulbs 33 by means of a pair of slip rings 43, mounted on the forward bellows-support 21, and a brush structure 45 which is carried by the rotatable light-source itself.

As previously noted, it is intended that the light-source 15 shall be rotated during the normal operation of the apparatus, and this is accomplished in the illustrated structure by means of a combination-motor and speed control unit 47, which is operatively connected to the rotatable light-support 31 by a belt 49 and pulley 51. The edge of the light-support disc is grooved to receive the belt. The individual light bulbs 33 which desirably are of the same wattage and light output, are so arranged on the disc support 31, that a substantially increased amount of illumination is provided in a direction outwardly from the optical axis of the camera lens.

More specifically, the individual light bulbs 33 are positioned at spaced intervals along a spiral (merely as a convenient means of mechanical arrangement), this spiral being indicated by the dot and dash line 55 in Figure 5. The exact position of each light unit 33 is, however, in accordance with a predetermined radial relationship to the optical axis. This position is determined by first fixing the radial distances of the inside and outside lamps (in accordance with the maximum size of the copy to be reproduced) and then locating the additional lamps between these two limits on such radial spacing that the radial distances between the light units decrease toward the outside limit to provide an increasing light intensity in accordance with the cosine fourth-power-law requirements. It can be shown that this arrangement of lights in a moving light-source, when the light units used are of substantially equal light-output, and are positioned in a generally flat plane, will effect the illumination of copy which is centrally disposed with reference to the light-source, in a plane extending generally parallel thereto, so as to produce a photographic image of substantially even intensity throughout the entire area thereof.

The arrangement and spacing of the lamps can also be determined empirically, as for example, by placing a first surface mirror on the copy board, then placing a single lamp at differing radial distances on the lamp support, and actually measuring the intensity of the illumination obtained for each lamp position. Additional lamps can then be arranged on the lamp support so as to increase the illumination on the copy board in the exact ratio necessary to obtain even tone images during the photographing operation.

The rotating light-source 15, in effect, scans the printing surface, printing form, or other copy to be photographed, so as to produce the desired shadow area outlining the various individual plano-relief surfaces contained therein, and by virtue of the controlled variation in the intensity of the illumination, it overcomes the difficulties experienced with prior art illuminating means, and particularly, the difficulties resulting from uneven density in the photographic images. The motion of the individual light units 33 also prevents localized, high intensity reflections, which might impair the quality of the image in the photographic plate or transparency.

When the apparatus illustrated in Figures 1 and 2 is used for photographing a printing surface, printing form, or the like, the material to be photographed is positioned on the copy board so as to be centrally located with respect to the optical axis 27 of the camera lens. The light-source 15 is then placed in operation, and after focusing of the camera 11, if necessary, an exposure is made in conventional manner. Normally, the print or transparency will be the same size as the material to be photographed, which will result in the copy being located at a distance from the optical center of the lens 19 which is approximately twice the focal length of that lens. The ground glass 25, during focusing, and the sensitized material during the exposure, will be located the same distance at the rear of the optical center of the lens.

When ordinary development and fixing procedures are followed, the intensity of the illumination provided by the light-source is desirably such that exposures of the order of about one-half to one minute will be required. In a particularly satisfactory embodiment of the apparatus, wherein standard 100 watt bulbs were used in the rotating light-source 15, and the exposure time was within the range of about 40 to 60 seconds, the supporting disc 31 for the individual light bulbs 33 was rotated at a speed within the range of from about 25 to 30 R. P. M. This light-source had an effective diameter of about 44 inches, the lens 19 having a focal length of 18 inches, and it was found possible to accomplish satisfactory illumination of material which could be contained within a circle approximately 22 inches in diameter. Under these conditions, light reflected from substantially all points in a plane surface disposed in the plane of the printing surface or other material to be photographed, and parallel to that surface, will intersect the optical axis of the lens at, or forwardly of, the optical center of that lens. Also, the individual plano surfaces are outlined by a shadow area, and the desired illumination is thus effected.

It will be understood, as previously noted, that it is possible to use light-sources of other types, and it is also possible to use other optical arrangements during the photographing operation. For example, in Figure 6, there is shown a generally flat, light-source 59, which comprises a plurality of fluorescent-tube units 61, symmetrically disposed on a plane support 63. At the central portion of the light-source 59, an elongated opening 65 is provided for the camera lens 19 with which the source of illumination is used, and it is intended that the light-source 59 shall be oscillated back and forth during the photographic operation to prevent localized reflections. Generally, if the amount of movement of the light-source is equal to the distance between the center lines of the adjacent fluorescent tubes 61, satisfactory results will be obtained.

When a flat light-source, such as is illustrated at 59 is used in connection with photographic apparatus similar to that illustrated in Figures 1 and 2, the light-source is desirably positioned in a plane which is adjacent the camera lens, and which is parallel to the surface to be photographed. To obtain the desired illumination in such a set-up, the maximum dimensions and the area of the material to be photographed should not be greater than one-half the maximum dimensions and the area of the light-source, as indicated by the dotted outline 67 in Figure 6, and the material to be photographed should be located on the copy board in a central position with respect to the optical axis of the lens. The intensity of the illumination produced on the material to be photographed by the light-source 59 is not as great as in the previously described embodiment, although quite satisfactory results can be obtained with a light-source of this character, particularly when the material to be reproduced is in the form of ordinary type or type slugs. The illumination produced by a light-source of this character is substantially in accordance with the inverse square law, and hence, is most suitable for use in photographing relatively small areas.

It is also possible to arrange the optical system in a right angle set-up, as illustrated in Figure 7. In this arrangement, the material to be copied, which is indicated at 69 and which may be a printing surface, or a combination of such surfaces as in a printing form, is positioned in a horizontal plane. Above the copy there is provided a transparent mirror 71 which is disposed at an angle of 45° to the plane of the material to be photographed. A suitable source of illumination, indicated generally at 73, which can be similar to the light-source shown in Figure 1 or Figure 6 is disposed above the mirror 71 and the material to be photographed, and the surface of the material is illuminated by light which passes through the transparent mirror. Here again, the dimensions of the light-source are such that a plane surface disposed in the plane of the printing surface or other material to be reproduced, and parallel to that surface will reflect light into the mirror 71 at such angles that it will intersect the optical axis of the system at, or forwardly of, the optical center of the lens. The lens is indicated diagrammatically at 75 and the photographic plate or other sensitized material at 77. The right angle arrangement shown in Figure 7 produces a lateral reversal of the image, as compared with the image produced by a straight-line arrangement, such as is illustrated in Figures 1 and 2, and this may be desirable for certain types of photo-mechanical reproduction. The practice of the method illustrated in Figure 7 is limited by the size of the transparent mirror 71 and by the cost of creating optically-plane surfaces in that mirror. For small units, as for example in the photographing of a single line of type or a single type-slug, the arrangement is very satisfactory. Also, such an arrangement could be used to advantage in photographing lines of type-matrices presented to it by a type-setting machine, similar to a linotype. In the arrangement of Figure 7, the camera and lighting unit can be interchanged in position, as is done in a microscope. This is quite satisfactory for small areas, but is somewhat inefficient for large areas, probably due to the scattering of light on both sides of the mirror.

In the interest of using as small a light-source as possible, the maximum dimensions of that source need be no greater than is necessary to cause light reflected from a plane surface disposed at the edge of, and parallel to, the material to be photographed to intersect the optical axis of the lens at the optical center of that lens. Preferably, the light-source is flat, as in the illustrated embodiments, and is disposed in a plane which is parallel to the surface of the material which is to be photographed. The light-source may be positioned at various points along the optical axis of the system, but as previously explained, it is most desirably positioned adjacent the lens. It will also be understood that the light-source need not be planar, although from a constructional viewpoint, this arrangement is greatly to be preferred.

Other variations and arrangements in the apparatus will suggest themselves to those skilled in the art. The most important advantage of the invention results in the ability of the apparatus to make possible the direct photographing of printing forms and copy material containing spaced-apart plano-relief printing surfaces of small area so as to obtain a high contrast uniform density print or transparency which can be used in the photo-mechanical art. Various of the features of the invention believed to be new are expressly set forth in the appended claims.

This application is a division of application, Serial No. 63,037, filed December 2, 1948, now Patent No. 2,609,293, issued September 2, 1952.

I claim:

1. In apparatus for photographing printing surfaces, printing forms, and the like, means providing a support for the material to be photographed, a camera which includes a lens, and a generally flat source of illumination which is positioned in a plane extending substantially parallel to the surface plane of the material to be photographed, said source of illumination including a plurality of individual light-sources and a rotatable support for said light-sources, said rotatable support being disposed adjacent said lens, and means for rotating said support and the light-sources mounted thereon during the operation of said apparatus.

2. In apparatus for photographing printing forms and like copy material containing spaced-apart, plano-relief printing surfaces, a flat-surface copyboard for supporting the material to be photographed, a camera which includes a lens, means supporting said camera with the optical axis thereof extending substantially normal to the surface of said copyboard, a generally planar light source for illuminating the material too be photographed, said planar light source being centered about said lens in a plane approximately normal to the optical axis thereof, having overall dimensions which are at least twice the corresponding dimensions of the working area on said copyboard, and increasing in intensity in a direction outwardly from the optical axis of said lens at such a rate that the light intensity at any point on the working surface of the copyboard varies substantially in accordance with the fourth power of the cosine of the angle which such point makes with the optical axis of the lens, whereby each of the individual printing surfaces in said copy material is outlined by a shadow area, and means for effecting movement of said source of illumination relative to the copy material to be photographed during the photographing operation.

3. In apparatus for photographing printing forms and like copy material containing spaced-apart, plano-relief printing surfaces, a flat-surface copyboard for supporting the material to be photographed, a camera which includes a lens and a generally flat source of illumination which is positioned in a plane extending substantially parallel to the surface plane of said copyboard, said source of illumination including a plurality of individual light-sources and a rotatable support for said light-sources, said source of illumination having overall dimensions which are at least twice the corresponding dimensions of the working area on said copyboard, said rotatable support for said light-sources being disposed adjacent said lens, and means for rotating said support and the light-sources mounted thereon during the operation of said apparatus.

4. In apparatus for photographing printing forms and like copy material containing spaced-apart, plano-relief printing surfaces, a flat-surface copyboard for supporting the material to be photographed, a camera which includes a lens and a generally flat source of illumination which is positioned adjacent said lens in a plane extending substantially parallel to the surface plane of said copyboard, said source of illumination increasing in intensity in a direction outwardly from the optical axis of said lens at such a rate that the light intensity at any point on the working surface of the copyboard varies substantially in accordance with the fourth power of the cosine of the angle which such point makes with the optical axis of the lens, said source of illumination including a plurality of light-sources and a rotatable support for said light-sources, and means for rotating said support and the light-sources mounted thereon during the operation of said apparatus.

References Cited in the file of this patent

UNITED STATES PATENTS

| | | |
|---|---|---|
| 1,597,598 | Jones | Aug. 24, 1926 |
| 1,946,323 | Kucharski | Feb. 6, 1934 |
| 1,949,020 | Kreusler | Feb. 27, 1934 |
| 2,153,186 | Henderson | Apr. 4, 1939 |
| 2,353,512 | Simmon | July 11, 1944 |

FOREIGN PATENTS

| | | |
|---|---|---|
| 287,712 | Germany | Oct. 2, 1915 |
| 75,989 | Switzerland | Mar. 16, 1918 |
| 553,542 | France | Feb. 13, 1923 |